United States Patent [19]

Stewart

[11] 3,983,761
[45] Oct. 5, 1976

[54] GARNITURE BELT

[75] Inventor: Emory Eugene Stewart, Pisgah Forest, N.C.

[73] Assignee: Olin Corporation, Pisgah Forest, N.C.

[22] Filed: Oct. 28, 1975

[21] Appl. No.: 626,482

[52] U.S. Cl. ............................. 74/231 R; 131/55
[51] Int. Cl.² ...................... F16G 1/00; A24C 1/00; B65G 15/30
[58] Field of Search ............ 74/231 A; 131/55, 25, 131/108; 198/193, 184, 129

[56] References Cited
UNITED STATES PATENTS

| | | | |
|---|---|---|---|
| 3,234,040 | 2/1966 | Kirwan | 74/232 |
| 3,613,692 | 10/1971 | Gomann | 198/193 X |
| 3,769,990 | 11/1973 | Williams | 131/108 |

Primary Examiner—Leonard H. Gerin
Attorney, Agent, or Firm—Robert W. Habel

[57] ABSTRACT

An endless woven garniture tape or belt for cigarette making machines comprising a combination of natural, chemically modified, and synthetic fibers in a unique blend and arrangement which possesses properties that result in superior wear life performance without sacrificing other performance criteria. The warp is made from combed sak cotton fiber threads, with a multiplicity of such threads mercerized and plied together to form each warp thread. The filling threads are made up of a multifilament synthetic core wrapped with cotton fiber with a multiplicity of such wrapped threads plied together to form each filling thread. Endless belts made according to this invention have a wear life approximating three times the normal wear life of conventional belts used on cigarette making machines.

6 Claims, 4 Drawing Figures

GARNITURE BELT

FIELD OF THE INVENTION

This invention relates generally to an improved endless garniture tape or belt for use on cigarette making machines. Such tapes or belts serve the purpose of pulling or conveying the cigarette paper together with the tobacco filler material through the garniture section of the cigarette making machine where the paper is formed around the tobacco material into a cylindrical shape, adhesive applied to the paper and sealed as a continuous rod which is then subsequently cut into desired segment lengths forming the individual cigarettes.

PRIOR ART

It is desirable that garniture belts for cigarette making machines be uniform, have good tracking properties, have moderately high tensile strength, be low in elongation, have proper frictional properties on the top and bottom surfaces of the belt, and provide the maximum wear life or yield of cigarettes per belt by containing the optimum blend of flexing and abrasion resistant properties in order to minimize failure and the "downtime" required to change belts. Conventional belts are endless woven and usually 100 percent cotton or linen in both the filling and warp. Other belts have utilized a linen fiber warp with a cotton-synthetic filling or weft. Although there are inherent advantages and disadvantages in the conventional belts, until the advent of high-speed cigarette making machines such belts were generally satisfactory and had a suitable wear life. On old style cigarette making machines, the belt normally traveled at around 250 to 400 feet per minute, the speed being such that belt wear and replacement were relatively infrequent. However, on the new high-speed cigarette making machines, the belt normally travels at 700 to 1000 feet per minute resulting in the belt being subjected to excessive heat and friction in the garniture and substantially increasing the alternating flexing action. On such machines, conventional belts wear out exceptionally fast requiring much downtime for replacement of new belts.

There have been relatively few advances or improvements in cigarette making machine belts over the years. One such improvement is disclosed in U.S. Pat. No. 3,234,040, which discloses treating conventional cigarette making machine belts with an application of microcrystalline wax for lubricating its internal fibers followed by an external coating of a lacquer. While such lubricating and coating combination is stated to considerably improve the working life of the belt, the belts have not been commercially acceptable. In part this is thought to be due to the fact that nothing was done to improve the basic structure or fiber component portion of the belt itself. Although it has been known to substitute synthetic filaments for the cotton or linen fiber threads used in the filling of conventional belts, such substitution in itself does not improve the belt's performance sufficient for use on highspeed cigarette making machines.

SUMMARY AND OBJECTS OF THE INVENTION

The primary object of this invention is to provide an endless woven garniture belt suitable for use on high-speed cigarette making machines. More specific objects are to provide a garniture belt with uniform dimensions having good tracking properties with moderately high tensile strength, that is low in elongation and otherwise dimensionally stable with proper frictional properties on the top and bottom surfaces, and that will provide the maximum wear life or yield of cigarettes per belt by containing the optimum blend of flexing and abrasion resistant properties in order to minimize failure and the downtime required to change belts on cigarette making machines.

In accordance with this invention, an improved garniture belt for cigarette making machines is provided comprising an endless woven belt having a warp of plied mercerized sak cotton threads, each warp thread comprising a multiplicity of single threads spun from combed sak cotton fiber, plied together and mercerized, and a structural weft or filling of cotton fibers and synthetic filaments comprising a multifilament synthetic core having a spun cotton fiber outer wrap with a multiplicity of such wrapped threads plied together to form each filling thread. Such warp and filling threads are then conventionally tightly woven into an endless greige fabric consisting of approximately 60 to 90 percent by weight warp threads and 10 to 40 percent by weight filling threads and the resulting fabric saturated with a suitable sizing formulation and cured to stabilize the belt to the desired dimensions. The synthetic filaments used in the filling are preferably polyamide or polyester.

DETAILED DESCRIPTION OF THE PREFERRED EMBODIMENT

Figure 1:
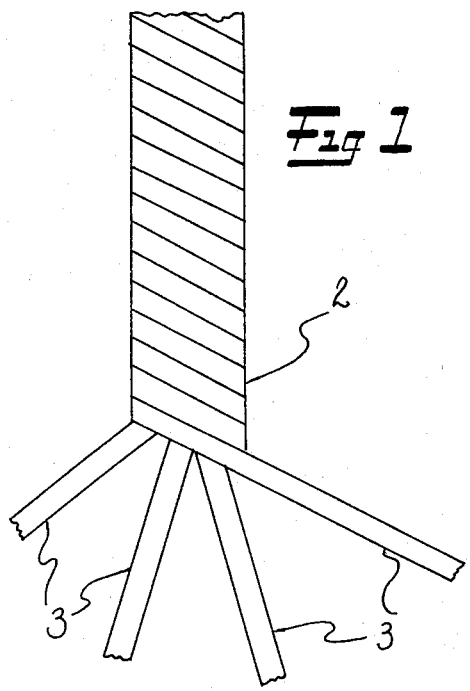
FIG. 1 illustrates a portion of a warp thread showing four sak cotton threads plied together and mercerized to form one warp thread.

The present invention is based upon the discovery that specially structured warp and filling threads comprising a particular combination of natural fiber and synthetic filaments can be conventionally woven into an endless belt and sized to produce a cigarette machine garniture belt having exceptional wear life without sacrificing other properties such as dimensional stability, flexibility, and tensile strength. Referring to the drawings, FIG. 1 illustrates a single warp thread 2 consisting of four individual threads 3 plied or twisted together. Each of single threads 3 is spun from combed sak cotton fibers and a multiplicity of such threads then plied together conventionally to form a single warp thread 2, which is then mercerized. The number of plies, ply twists per inch, grams per denier breaking strength, and total linear density of the mercerized sak cotton warp threads can vary over a wide range depending upon the properties desired. A typical construction may comprise three or four plies of 30's through 12's cotton count mercerized sak cotton fiber threads, ply twisted in either the $s$ or $z$ direction at 7 to 15 turns per inch with the resulting plied thread having an average breaking strength ranging from 3 to 4 grams per denier.

Figure 2:
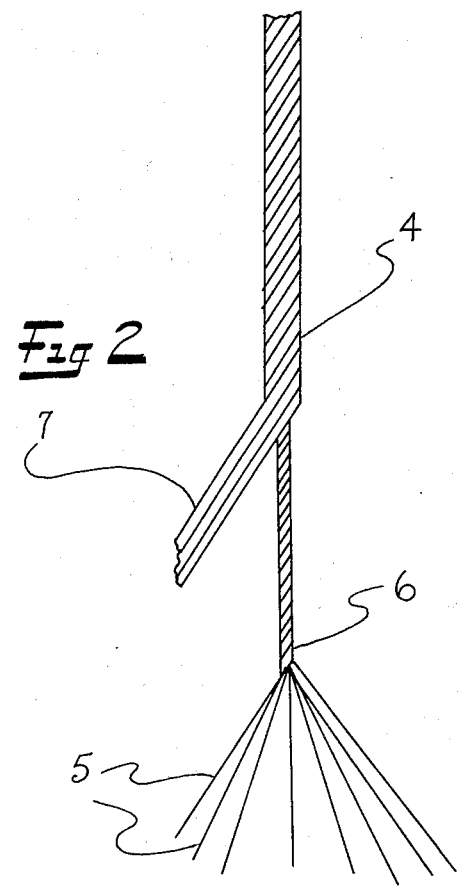
FIG. 2 is an illustration of a portion of one component of the filling thread showing a multifilament synthetic core wrapped with a cotton fiber overwrap.
Figure 3:
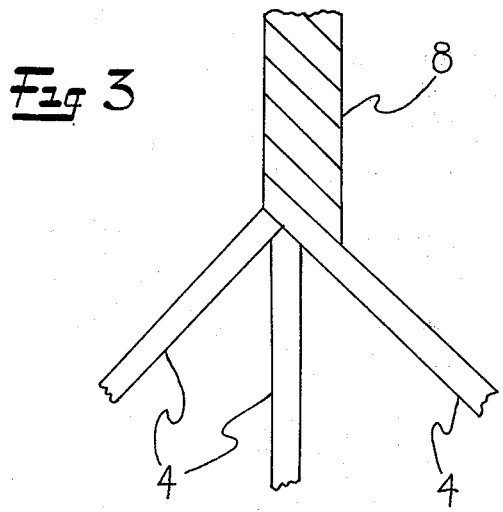
FIG. 3 is an illustration of part of a filling thread showing three of the threads depicted in FIG. 2 plied together to form a single filling thread.

FIG. 2 illustrates one of the single wrapped core threads 4 used to make up a plied filling or weft thread. As shown, a plurality of individual synthetic filaments 5 are twisted together to form a multifilament core 6 and simultaneously overwrapped with a layer of spun cotton fibers 7. A multiplicity of such wrapped core threads 4 are then plied together to form a filling thread 8 as shown in FIG. 3. The number of core threads plied together to make up each filling thread can vary over a wide range as can the ply twists per inch and total linear density. Percentages by weight of cotton wrap to synthetic core, number of filaments in each core and grams per denier breaking strength may also vary depending upon the results desired. Typical filling threads may consist of three to six plies of core threads, each having a cotton count ranging from 40's through 15's, ply twisted in either the s or z directon from 6 to 12 turns per inch, each core thread comprising 60 to 90 percent by weight of a multifilament high tenacity polyester core and 10 to 40 percent by weight long staple sak cotton fiber sheath, with the resulting thread haing a breaking strength ranging from 4.5 to 7 grams per denier. The synthetic core may be either polyester or polyamide (nylon) multifilament yarn and the number of filaments per core can vary over a wide range but preferably from 34 to 72 filaments per core.

Figure 4:
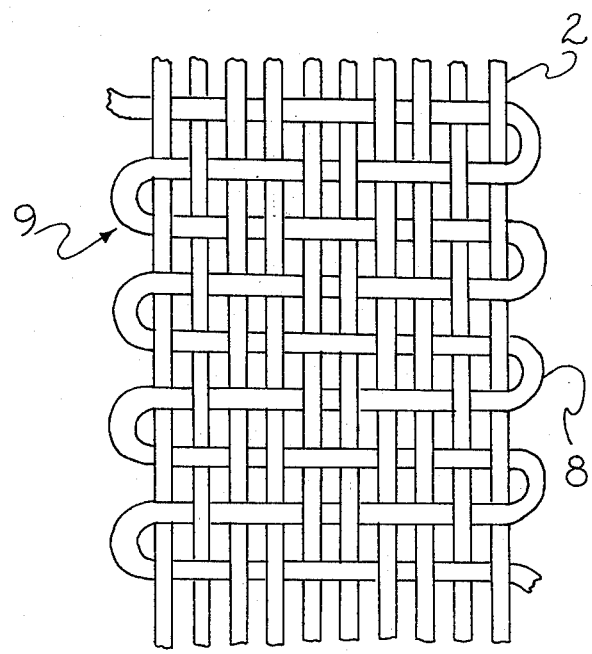
FIG. 4 is a diagrammatic view in elevation of a section of the woven garniture belt showing a typical weave of the warp and filling threads depicted in FIGS. 1 and 3.

FIG. 4 shows the fabric construction for an endless garniture belt, generally designated 9 in the drawing, using the aforedescribed warp threads 2 and filling threads 8. A number of fabric constructions can be used to achieve the desired results. Preferred weave types may be plain, modified plain, or twill. Typical fabric counts are 60 to 100 warp ends per inch and 14 to 25 filling picks per inch. A particularly preferred garniture tape is a modified plain weave (2–1 filling rib) containing a fabric count of 80 warp ends per inch and 19 filling picks per inch in the greige state. After weaving, the greige fabric belt is soaked in a sizing solution and heat cured to stabilize the belt to the desired dimensions. A preferred sizing solution is nylon dissolved in an ethanol-water mixture comprising approximately 14 percent polyamide (nylon 66), 57 percent anhydrous ethanol, and 29 percent water, all parts by weight. Starch or vinyl acetate sizing solutions may also be used.

The garniture belts can be woven in a wide range of widths, lengths, and thicknesses depending upon the diameter of the cigarette to be manufactured and the model of cigarette making machine on which it is to be used. Dimensions for a typical belt are approximately 22 mm wide, 2800 mm in circumference, and 0.6 mm thick.

EXAMPLE

A number of endless garniture belts were woven from the following warp and filling threads according to the invention. The warp threads consisted of four single threads plied together in the s direction 9.6 turns per inch. Each of the single threads was spun from combed sak cotton fibers, plied together and mercerized to form the warp thread. Each plied warp thread had a breaking strength of approximately 3.5 grams per denier. The filling threads consisted of three wrapped core threads ply twisted together in the s direction 8.5 turns per inch. Each single thread used in making up a filling thread consisted of a 220 denier 72 filament high tenacity polyester yarn core wrapped in a one-layer sheath of long staple sak cotton fiber, each such thread having a 19's cotton count, comprising 80 percent by weight polyester core and 20 percent by weight fiber sheath. The resulting filling thread had a breaking strength of approximately 5.7 grams per denier. Garniture belts were then endless woven from the aforedescribed warp and filling threads using a modified plain weave (2–1 filling rib) containing a fabric count of 80 warp ends per inch and 19 filling picks per inch in the greige state. The greige fabric belt was then soaked in a polyamide sizing solution comprising by weight approximately 14 percent nylon 66, 57 percent anhydrous ethanol, and 29 percent water. The nylon 66 pellets used in making up the sizing solution are sold commercially by E. I. du Pont de Nemours & Co., Inc. under the trademark ELVAMIDE 8061. After sizing the belts were then heat cured to stabilize them to average dimensions of 22 mm wide, 2800 mm in circumference, and 0.6 mm thick. The finished belts were then tested on high-speed cigarette making machines for wear life and other performance properties. All were found to be far superior in wear life when compared to conventional belts made from 100 percent cotton in both the warp and filling, without sacrificing any of the other required performance criteria.

The unique combination of plied warp threads made from mercerized sak cottom fiber threads and plied filling core threads made from a multifilament synthetic core wrapped with a cottom fiber sheath as the single thread when woven into endless garniture belts, sized, and cured results in outstanding performance in the areas of tensile strength, elongation, flex and abrasion resistance. Such belts have an average increase in wear life of three times that of conventional garniture belts made identically from regular grade cotton threads in the warp and filling.

Although the present invention has been described in conjunction with the preferred embodiments and drawings, the examples and description are only illustrative of the invention and it is to be understood that many variations and modifications may be resorted to without departing from the spirit and scope of the invention as those skilled in the art will readily understand.

The invention claimed is:

1. An improved garniture belt for cigarette making machines having optimum properties of wear and abrasion resistance, flexibility, tensile strength, and dimensional stability, comprising a narrow endless woven fabric belt of predetermined length made from specially structured warp and filling threads, said warp threads consisting of a plurality of sak cotton fiber threads plied together and mercerized to form each warp thread, said filling threads consisting of a plurality of synthetic core threads plied together to form each filling thread, each said core thread comprising a multifilament synthetic core overwrapped with a sheath of cotton fibers, and said woven belt impregnated with a sizing solution and cured to stabilize the belt to the desired dimensions.

2. The garniture belt of claim 1 in which the synthetic core is a multifilament polyamide yarn.

3. The garniture belt of claim 1 in which the synthetic core is a multifilament polyester yarn.

4. The garniture belt of claim 1 impregnated with a polyamide sizing formulation.

5. The garniture belt of claim 1 in which the endless woven fabric consists of about 60 to 90 percent by weight warp threads and 10 to 40 percent by weight filling threads.

6. An improved garniture belt for cigarette making machines having optimum properties of wear and abrasion resistance, flexibility, tensile strength, and dimensional stability, comprising a narrow endless woven fabric belt of predetermined length made from specially structured warp and filling threads, the weave type of said belt selected from the group consisting of plain, modified plain, and twill, each said warp thread consisting of from 3 to 4 sak cotton fiber threads plied together and mercerized, each said filling thread consisting of from 3 to 6 synthetic core threads plied together, each said core thread comprising a multifilament synthetic core overwrapped with a sheath of cotton fibers, said core comprising from 34 to 72 filaments selected from the group consisting of polyester and polyamide filaments, and said woven belt impregnated with a polyamide sizing solution and heat cured to stabilize the belt to the desired dimensions.

* * * * *